United States Patent Office 2,895,951
Patented July 21, 1959

2,895,951
DISAZO DYESTUFFS AND THEIR METAL COMPLEX COMPOUNDS

Willy Steinemann, Basel, Switzerland, assignor to Sandoz Ltd. (also known as Sandoz A.G.), Basel, Switzerland, a Swiss firm No Drawing. Application April 14, 1958
Serial No. 728,115

Claims priority, application Switzerland April 17, 1957

7 Claims. (Cl. 260—160)

The present invention relates to disazo dyestuffs and their metal complex compounds, which in the metal-free state correspond to the general formula

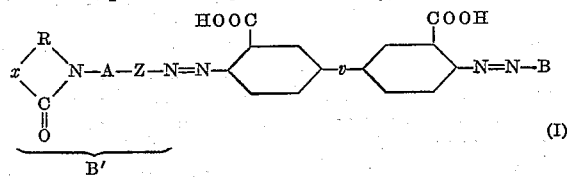
(I)

wherein:

$v$ stands for a simple carbon linkage, or the divalent radical of urea or of an ethylene dicarboxylic acid amide, of a butadiene-1.4-dicarboxylic acid amide or of a benzene-1.4-dicarboxylic acid amide which may be further substituted, $x$ a simple carbon linkage or an oxygen atom, Z one of the radicals

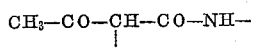

or

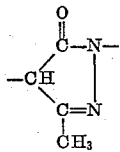

R a branched or unbranched hydrocarbon chain with 3 to 4 carbon atoms lying between —N< and —x—, when $x$ stands for a simple carbon linkage, or a branched or unbranched hydrocarbon chain with 2 to 3 carbon atoms lying between —N< and $x$, when $x$ stands for an oxygen atom, A a sulfonated phenylene radical, a sulfonated diphenylene radical or a disulfostilbenyl radical, and B for B', or for a radical different from B' but of the same general formula or for the radical of a coupling component different from B', which contains a substituent capable of metal complex formation and which couples in the ortho position to the said substituent.

A series of particularly valuable dyestuffs comprises the metallizable disazo dyestuffs which correspond to the formula

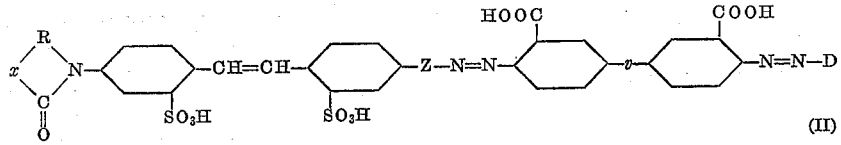
(II)

wherein:

$x$, $v$, R and Z have the above-named meanings, and
D stands for the radical of a 1-phenyl-3-methyl-5-pyrazolone, of a 1-naphthyl-3-methyl-5-pyrazolone sulfonic acid, of an amino- or of an acylamino-hydroxynaphthalenesulfonic acid coupled in ortho-position to the enolic or phenolic hydroxy group.

The process for the production of the new disazo dyestuffs and their metal complex compounds consists in coupling 1 mol of the tetrazo compound of an aromatic diamine of the formula

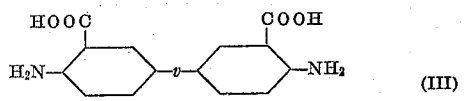
(III)

wherein $v$ possesses the above-mentioned meaning, with 2 moles of a coupling component which couples on the active methylene group (→) and has the formula

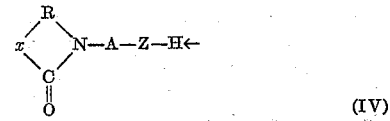
(IV)

wherein $x$, A and R possess the aforecited meanings and —ZH is one of the radicals

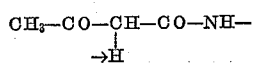

or

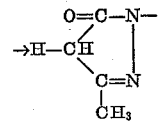

or with 1 mol of a coupling component of Formula IV and 1 mol of a coupling component different from it but also of general Formula IV, or with 1 mol of a coupling component of Formula IV and 1 mol of any other coupling component containing a substituent capable of metal complex formation and coupling in the ortho-position to the said substituent and treating the resultant disazo dyestuff with a metal-yielding agent on the fiber, when $v$ represents the simple carbon linkage, and in substance or on the fiber when $v$ has another meaning.

For the production of disazo dyestuffs in which $v$ stands for the divalent radical of urea or of an, if desired substituted, ethylene-1.2-dicarboxylic acid amide, butadiene-1.4-dicarboxylic acid amide or benzene-1.4-dicarboxylic acid amide, a special mode of operation of the process is also suitable. It involves coupling 1 mol of the diazo compound of an amine of the formula

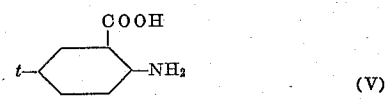
(V)

wherein $t$ stands for a nitro or an acylamino group, with 1 mol of a coupling component of Formula IV which couples on the active methylene group (→), reducing in the monoazo dyestuff so formed the substituent $t$, if it is a nitro group, or hydrolyzing it, if it is an acylamino group, reacting 2 mols of the resultant aminomonoazo compound or 2 mols of a mixture of at least 1 mol of the resultant aminomonoazo compound and not more than 1 mol of a monoazo dyestuff containing a primary amino group and corresponding to the formula

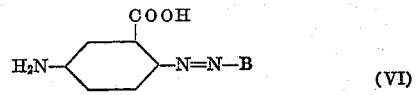
(VI)

wherein B possesses the abovenamed meaning, with phosgene or a functional derivative of an ethylene-1.2-dicarboxylic acid, butadiene-1.4-dicarboxylic acid or benzene-1.4-dicarboxylic acid, which may be further substituted, and treating the azo dyestuff obtained in this way with a metal-yielding agent either in substance or on the fiber.

The diamines of Formula III are tetrazotized in the normal manner at 0–5° C. The tetrazo compounds thus obtained are coupled with the coupling components of Formula IV or with the coupling components of Formula IV plus the coupling components containing a substituent capable of metal complex formation and coupling in ortho-position thereto in a weakly acid to weakly alkaline medium at 0° to 10° C., if desired with the addition of pyridine or a mixture of pyridine bases.

To obtain the symmetrical disazo dyestuffs 1 mol of the tetrazo compound of a diamine of Formula III is coupled with 2 mols of a coupling component of Formula IV, the operation being carried out to best effect in one step using a weakly alkaline medium.

The asymmetrical disazo dyestuffs are produced by coupling 1 mol of the tetrazo compound of a diamine of Formula III with 1 mol of a coupling component of Formula IV and 1 mol of a coupling component of Formula IV which is different from the first, or with 1 mol of a coupling component of Formula IV and 1 mol of any other coupling component containing a substituent capable of metal complex formation and coupling in the ortho-position to the said substituent. A one-step process can be adopted, the two coupling components being employed as a mixture in a weekly alkaline medium. Alternatively, coupling can be carried out in two stages; the tetrazo compound is coupled with one of the coupling components in acid medium and the diazomonoazo compound so obtained is then coupled with the second coupling component in a neutral to alkaline medium, if desired in presence of pyridine or a mixture of pyridine bases.

In the special mode of operation of the process, the amines of general Formula V are diazotized in the normal way at 0°–5° C. The resultant diazo compounds are coupled with the coupling components of Formula IV in weakly alkaline to weakly acid medium at 0° to 10° C.; in certain cases the progress of the coupling reaction is favorably affected by an addition of pyridine. The reduction of the nitromonoazo compounds with alkali metal sulfides or hydrosulfides is carried out at higher temperatures, e.g. from 40° to 60° C. Reduction can follow immediately after coupling; alternatively, the nitromonoazo compound may be isolated from the coupling mass, e.g. by salting out, and redissolved. Saponification of the acylaminomonoazo compounds is effected preferably by heating in a 1–2% alkali metal hydroxide solution to a temperature of 70° to 90° C.

By employing an aqueous, weakly alkaline solution, the combining of 2 mols of the aminomonoazo compound, obtainable according to the special mode of operation of the process, or of 2 mols of a mixture containing at least 1 mol of an aminomonoazo compound of this type and not more than 1 mol of a dyestuff containing a primary amino group by treatment with phosgene at higher temperatures is readily accomplished. Similarly, when one of the first named reactants is combined at low temperature with a functional derivative of an ethylene-1.2-dicarboxylic acid, butadiene-1.4-dicarboxylic acid or benzene-1.4-dicarboxylic acid, which may be further substituted if desired, an aqueous, weakly alkaline solution is preferable. As a functional derivative of the afore-named carboxylic acids the chloride is preferred.

To render harmless the liberated hydrogen chloride it is combined with alkali or alkaline earth metal compounds of alkaline reaction which act as buffer substances; examples of these are the carbonates, hydroxides and/or oxides of alkaline earth metals, alkali and alkaline earth metal acetates and phosphates.

The final disazo dyestuffs are separated from aqueous solution by salting out or acidifying and are then filtered off, washed, and if desired converted into their neutral alkali metal salts in the form of pastes, and then dried. On grinding they are obtained as yellow to brown powders which dissolve in water with a yellow to brown coloration. They show good affinity for cellulosic fibers, yielding yellow to brown shades which upon treatment with copper salts possess very good fastness to light, pressing, alkalis, acids, scrooping, crocking, dry cleaning, and wet agencies, primarily washing, water, and perspiration. Both the uncoppered and the coppered dyeings are readily dischargeable and stable to crease-resistant finishing processes.

If the dyestuffs, in which $v$ represents the divalent radical of urea or a possibly substituted ethylenedicarboxylic acid amide, butadiene-1.4-dicarboxylic acid amide or benzene-1.4-dicarboxylic acid amide, contain a sufficient number of water-solubilizing groups to permit them to be dyed as metal complex compounds, it is advantageous to metallize them in substance. For this purpose they are treated in aqueous solution with copper- or nickel-yielding agents, preferably in presence of an acid-binding agent.

The metal complex compounds dye cellulosic fibers in yellow to brown shades which are fast to light, wet agencies, pressing, alkalis, acids, crocking and dry cleaning. They reserve cellulose acetate, cellulose triacetate and polyester fibers. The dyeings are readily dischargeable and are stable to crease-resistant finishing processes. Their wet fastness properties can be further improved by aftertreatment with a polyalkylene polyamine in presence of a copper salt.

In the following examples the parts and percentages are by weight and the temperatures in degrees centigrade.

EXAMPLE 1

27.2 parts of 4.4′-diamino-1.1-diphenyl-3.3′-dicarboxylic acid are dissolved in 250 parts of water at 40–50° by neutralization with 11 parts of calcined sodium carbonate. On cooling to 0–5° 92 parts of 30% hydrochloric acid are added to the solution followed dropwise by a 30% aqueous solution of 13.8 parts of sodium nitrite. The complete tetrazo solution is maintained at 0–5° by continued cooling while sufficient sodium bicarbonate is added to give a pH value of 4.0. A very fine ice-cold suspension of 17.4 parts of 1-phenyl-3-methyl-5-pyrazolone of pH 5 is then run into the solution. After 1 hour's agitation at 0–5°, 56.5 parts of the coupling component of the formula

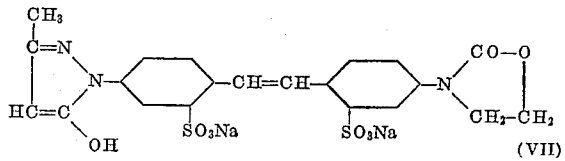

(VII)

in 400 parts of water are added to the suspension of the intermediate compound. With further cooling at 0–5° sufficient calcined sodium carbonate is added to the coupling mass to give the resultant dyestuff suspension a pH value of about 9.0. On completion of coupling the asymmetrical disazo dyestuff is completely precipitated with common salt and after filtering with suction is dried and ground. A brown powder is obtained which dissolves in water with an orange coloration and in concentrated sulfuric acid with a red coloration. It exhibits extremely high affinity for all cellulosic fibers—cotton, viscose rayon and cuprammonium rayon. On these fibers it gives dyeings of outstanding fastness to light, washing and perspiration especially when aftertreated with copper-yielding agents. In addition the dyeings are dischargeable, fast to crocking and dry cleaning, and stable to crease-resistant processes and to 1% hydrochloric acid, alkane- or 4-methylbenzenesulfonic acid.

The same dyestuff is obtained in equally good yield when the 4.4'-tetrazo-1.1'-diphenyl-3.3'-dicarboxylic acid in the first step of the process is coupled with the coupling component of Formula VII and in the second step with 1-phenyl-3-methyl-5-pyrazolone.

The coupling component of Formula VII used in the present process is produced as follows.

45.1 parts of 1-[4''-aminostilbenyl(4')]-3-methyl-5-pyrazolone-2'.2''- disulfonic acid are dissolved in 500 parts of water and 15.5 parts of 30% sodium hydroxide solution. 13.5 parts of crystallized sodium acetate are added to the solution, which is then cooled with 200 parts of ice to 8–12°. Over a period of 5 hours a sufficient quantity of chloroformic acid-β-chloroethyl ester (about 15 parts are necessary) is added dropwise until no free amino groups are indicated in the suspension. The derivative of the carbamic acid-β-chloroethyl ester thus produced is converted into the new coupling component (VII) by dropping in 30% sodium hydroxide solution at an even rate over the next 5 hours in sufficient quantity to maintain the suspension at a constant pH value of 9.5–10.5. Agitation is continued for a further 20 hours at 8–12° and the new compound is finally precipitated at room temperature by the addition of 150 parts of 30% hydrochloric acid.

The dyeing method is as follows.

A dye liquor is prepared with 3000 parts of softened water and 1 part of the metal-free disazo dyestuff obtained according to the details given in the first paragraph of this example. 100 parts of previously wetted out cotton are entered at 30°, and 5 parts of sodium sulfate added to the liquor. The temperature is increased in 30 minutes to 100°, the bath being given additions of 7.5 parts of sodium sulfate at 50° and 70°. After 15 minutes at 100°, 7.5 parts of sodium sulfate are added and the bath allowed to cool. The cotton is removed at 50° and rinsed with cold water. It is dyed to an orange shade.

Aftercoppering of the dyestuff on the fiber is carried out in a bath of 3000 parts of water, 2 parts of 30% acetic acid and 2 parts of crystallized copper sulfate for 30 minutes at 70°. The material is then rinsed in cold water and dried at 60°. The orange shade has very good fastness to light, washing and perspiration.

EXAMPLE 2

18.2 parts of 2-amino-5-nitrobenzene-1-carboxylic acid in the form of the ammonium salt are mixed with 250 parts of water and after the addition of 35 parts of 30% hydrochloric acid are diazotized with 7.6 parts of sodium nitrite in 20 to 25 minutes. After the nitrous acid has been destroyed by the addition of a little amidosulfonic acid, the clear diazo solution is allowed to cool at 0–5°. In the course of 1 hour it is run into an ice-cold, weakly acetic acid solution of 59 parts of the coupling component of Formula VII and 30 parts of sodium acetate in 700 parts of water. On completion of coupling the mass is heated to 70° and the monoazo dyestuff precipitated and filtered off.

For conversion into the aminoazo dyestuff the moist presscake is stirred into 3000 parts of water at 40°, and 35 parts of approximately 60% sodium sulfide are added to the suspension in 20–30 minutes. After a further 20 minutes at 40° the aminoazo dyestuff is precipitated with salt and filtered off. The aminoazo compound, obtained as the trisodium salt, is dissolved in 2500 parts of water.

A 20% solution of fumaric acid dichloride in chlorobenzene is added with vigorous stirring until no further diazotizable amino groups are indicated. The reaction mixture is then heated to 90°, upon which the disazo dyestuff is salted out, filtered off and dried. It is ground to give a bright orange-red powder which dissolves in concentrated sulfuric acid with a yellow, and in water with an orange coloration. It dyes cotton and cellulosic fibers in orange shades which upon aftertreatment with copper-yielding agents possess excellent fastness to light, washing and perspiration.

EXAMPLE 3

158 parts of the disazo dyestuff of Example 2 are dissolved in 3000 parts of water at 60°. After the addition of 60 parts of crystallized sodium acetate and a solution of 50 parts of crystallized copper sulfate in 250 parts of water, the solution is stirred for 30 minutes at 80°. The copper complex compound is then completely precipitated with salt, and filtered off, washed with brine and dried. On grinding it is obtained as a brown powder which dissolves in water with an orange, and in concentrated sulfuric acid with a reddish yellow coloration. It dyes cotton and cellulosic fibers in orange shades of very good fastness to light, washing and perspiration.

EXAMPLE 4

When the 50 parts of crystallized copper sulfate employed in Example 3 for coppering in substance are replaced by 57 parts of crystallized nickel sulfate and the operating procedure of that example is followed, a nickel-containing azo dyestuff is obtained which dyes cotton and cellulosic fibers in orange-yellow shades which are fast to light and wet treatments.

EXAMPLE 5

37.5 parts of the aminomonoazo compound which is obtainable according to Example 2 and has the formula

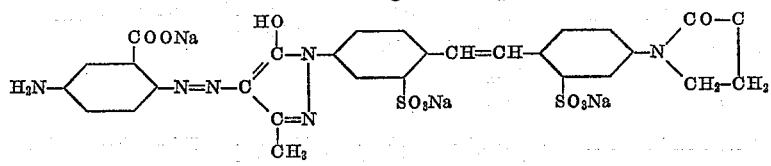

and 24.4 parts of the aminomonoazo compound of the formula

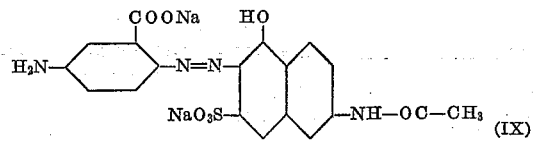

are dissolved in 1500 parts of water at 60°. After the addition of 5 parts of anhydrous sodium carbonate the solution is heated to 60°. At this temperature an even stream of phosgene is injected into the vigorously agitated solution. The reaction solution is maintained weakly alkaline (pH 9–10) by the continuous addition of a 20% sodium carbonate solution. As soon as no further diazotizable amino groups are indicated the disazo dyestuff is isolated by the standard method and dried. On grinding it is obtained as a dark powder which dissolves in water to give brown solutions and dyes cotton and cellulosic fibers in brown shades. The aftercoppered dyeings possess very good light fastness and good wet fastness properties.

EXAMPLE 6

The tetrazo compound obtained from 13.6 parts of 4.4'-diamino-1.1'-diphenyl-3.3'-dicarboxylic acid by the procedure of Example 1 is adjusted at 0–5° to about pH 4 with sodium carbonate. It is then run slowly into a weakly alkalified solution of 56.5 parts of the coupling component of Formula VII in 400 parts of water at 0-5°. The pH value of the coupling mass is maintained at 9 to 10 by the addition of a 20% sodium carbonate solution. When the coupling reaction is completed the symmetrical disazo dyestuff is completely precipitated with common salt, and is then filtered off, dried and ground. It is a brown powder which dissolves in water with an orange coloration and dyes cotton and cellulosic fibers in orange shades. The fastness properties of the dyeings are substantially improved by aftertreatment with copper-yielding agents.

Further disazo dyestuffs and their metal complex compounds are set out in Tables I and II; they are obtainable according to the operating procedures described in Examples 1 to 6. The disazo dyestuffs and their metal complex compounds which figure in Table I correspond in the metal-free state to the formula

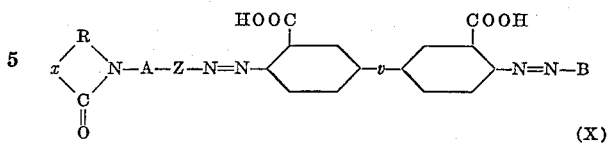

and are characterized by the symbols A, B, R, Z, $v$ and $x$ by the form in which they are applied, and by the shade of the metal-containing dyeing on cotton. In the column "Form in which applied" the abbreviations stand for Cu–C = Copper complex compound
Ni–C = Nickel complex compound
Aftercop. = Aftercoppering dyestuff

*Table I*

| Ex. No. | A | Z | B radical of— | R | $v$ | $x$ | Form in which applied | Shade of metal-containing dyeing on cotton |
|---|---|---|---|---|---|---|---|---|
| 7 | 2.2'-disulfo-4.4'-stilbenyl. | O=C—N—<br>—CH<br>　＼C=N<br>　　CH₃ | 1-(3'-chloro)-phenyl-3-methyl-5-pyrazolone. | —(CH₂)₃— | | —O— | Aftercop. | Orange. |
| 8 | ....do........ | O=C—N—<br>—CH<br>　＼C=N<br>　　CH₃ | 1-phenyl-3-methyl-5-pyrazolone-3'-sulfonic acidamide. | (CH₂)₃— | —HN—CO—NH— | —O— | Aftercop. | Do. |
| 9 | ....do........ | O=C—N—<br>—CH<br>　＼C=N<br>　　CH₃ | 1-(3'-cyano)-phenyl-3-methyl-5-pyrazolone. | —CH₂—CH₂— | | —O— | Aftercop. | Orange-red. |
| 10 | ....do........ | O=C—N—<br>—CH<br>　＼C=N<br>　　CH₃ | 1-phenyl-5-pyrazolone-3-carboxylic acid-amide. | —CH₂—CH₂— | | —O— | Aftercop. | Orange. |
| 11 | ....do........ | O=C—N—<br>—CH<br>　＼C=N<br>　　CH₃ | 1-[3'-(1''-aza-2''-keto-3''-oxa)-cyclopentyl]-phenyl-3-methyl-5-pyrazolone. | —CH₂—CH₂— | —HN—CO—NH— | —O— | Aftercop. | Do. |
| 12 | ....do........ | O=C—N—<br>—CH<br>　＼C=N<br>　　CH₃ | 1-phenyl-3-methyl-5-pyrazolone. | —(CH₂)₃— | | | Aftercop. | Do. |
| 13 | ....do........ | O=C—N—<br>—CH<br>　＼C=N<br>　　CH₃ | 1-acetoacetylaminobenzene-4-sulfonic acid. | —(CH₂)₃— | —HN—OC—CH<br>　　　　‖<br>—HN—OC—CH | —O— | Aftercop. | Yellow-orange. |
| 14 | ....do........ | O=C—N—<br>—CH<br>　＼C=N<br>　　CH₃ | 2-acetoacetylamino-naphthalene-6-sulfonic acid. | —CH₂—CH₂— | | —O— | Aftercop. | Orange. |
| 15 | ....do........ | O=C—N—<br>—CH<br>　＼C=N<br>　　CH₃ | 1-acetoacetylamino-2-ethylhexane. | —CH₂—CH₂— | | —O— | Aftercop. | Yellow-orange. |
| 16 | ....do........ | O=C—N—<br>—CH<br>　＼C=N<br>　　CH₃ | 2-acetylamino-5-hydroxynaphthalene-7-sulfonic acid. | —CH₂—CH₂— | | —O— | Aftercop. | Brown. |

Table I—Continued

| Ex. No. | A | Z | B radical of— | R | v | x | Form in which applied | Shade of metal-containing dyeing on cotton |
|---|---|---|---|---|---|---|---|---|
| 17 | 2.2'-disulfo-4.4'-stilbenyl. | O=C—N—<br>—CH<br>C=N<br>CH₃ | 2-amino-8-hydroxy-naphthalene-6-sulfonic acid. | —CH₂—CH₂— | | —O— | Aftercop.. | Brown. |
| 18 | ....do.... | O=C—N—<br>—CH<br>C=N<br>CH₃ | ....do.... | —CH₂—CH₂— | —HN—CO—NH— | —O— | Ni—C.... | Do. |
| 19 | ....do.... | O=C—N—<br>—CH<br>C=N<br>CH₃ | 1-benzoylamino-8-hydroxynaphthalene-3.6-disulfonic-acid. | —CH₂—CH₂— | —HN—CO—NH— | —O— | Cu—C.... | Do. |
| 20 | ....do.... | O=C—N—<br>—CH<br>C=N<br>CH₃ | 2-hydroxynaphthalene-3.6-disulfonic acid. | —(CH₂)₃— | —HN—OC—⟨C₆H₄⟩—HN—OC— | —O— | Cu—C.... | Brown-orange. |
| 21 | ....do.... | O=C—N—<br>—CH<br>C=N<br>CH₃ | 1 - naphthyl(2') - 3 - methyl - 5 - pyrazolone - 5'.7' - disulfonic acid. | —(CH₂)₄— | —HN—OC—⟨C₆H₄⟩—HN—OC— | | Cu—C.... | Orange. |
| 22 | 2 - sulfo - 4.4'-diphenylene. | O=C—N—<br>—CH<br>C=N<br>CH₃ | 1 - (4' - chloro) - phenyl-3 - methyl - 5 - pyrazolone. | —CH₂—CH₂— | | —O— | Aftercop.. | Do. |
| 23 | ....do.... | O=C—N—<br>—CH<br>C=N<br>CH₃ | 1 - phenyl - 3 - methyl - 5 - pyrazolone - 3' - sulfonic acid. | —CH₂—CH₂— | —HN—OC—CH ‖ —HN—OC—CH | —O— | Aftercop.. | Yellow-orange. |
| 24 | ....do.... | O=C—N—<br>—CH<br>C=N<br>CH₃ | 1 - phenyl - 5 - pyrazolone - 3 - carboxylic acid-phenylamide. | —CH₂—CH₂— | | —O— | Aftercop.. | Orange. |
| 25 | ....do.... | O=C—N—<br>—CH<br>C=N<br>CH₃ | 1-acetoacetylaminobenzene-4-sulfonic acid. | —CH₂—CH₂— | —HN—OC—⟨C₆H₄⟩—HN—OC | —O— | Aftercop.. | Yellow-orange. |
| 26 | ....do.... | O=C—N—<br>—CH<br>C=N<br>CH₃ | 2-hydroxynaphthalene-6-sulfonic acid. | —(CH₂)₃— | —NH—CO—NH— | | Aftercop.. | Orange-brown. |
| 27 | ....do.... | O=C—N—<br>—CH<br>C=N<br>CH₃ | 1-hydroxynaphthalene-4-sulfonic acid. | —(CH₂)₃— | —HN—OC—CH=CH —HN—OC—CH=CH | —O— | Aftercop.. | Brown. |
| 28 | 2-sulfo-1.4-phenylene. | O=C—N—<br>—CH<br>C=N<br>CH₃ | 1 - acetoacetylamino - 2 - methoxybenzene. | —CH₂—CH₂— | | —O— | Aftercop.. | Reddish yellow. |

Table I—Continued

| Ex. No. | A | Z | B radical of— | R | v | x | Form in which applied | Shade of metal-containing dyeing on cotton |
|---|---|---|---|---|---|---|---|---|
| 29 | 2-sulfo-1.4-phenylene. | O=C—N / —CH / C=N / CH₃ | 2-hydroxynaphthalene-3-carboxylic acidamide. | —CH₂—CH₂— | | —O— | Aftercop.. | Orange. |
| 30 | ....do........ | O=C—N / —CH / C=N / CH₃ | 2-hydroxynaphthalene-6.8-disulfonic acid. | —CH₂—CH₂— | —HN—OC—⌬—CO—NH— | —O— | Cu—C.... | Do. |
| 31 | ....do........ | O=C—N / —CH / C=N / CH₃ | ....do............ | —CH₂—CH₂— | —HN—OC—⌬—CO—NH— | —O— | Ni—C.... | Do. |
| 32 | 2.2′-disulfo-4.4′-stilbenyl. | O=C—N / —CH / C=N / CH₃ | 2-hydroxynaphthalene-4-sulfonic acid. | —(CH₂)₄— | —HN—CO—NH— | | Cu—C.... | Brown. |
| 33 | ....do........ | O=C—N / —CH / C=N / CH₃ | 1-(4′-methyl)-phenyl-3-methyl-5-pyrazolone-3′-sulfonic acid-amide. | —(CH₂)₃— | —HN—CO—NH— | —O— | Aftercop.. | Orange. |
| 34 | ....do........ | O=C—N / —CH / C=N / CH₃ | 1-(3′-chloro)-phenyl-3-methyl-5-pyrazolone. | —CH₂—CH₂— | | —O— | Aftercop.. | Do. |
| 35 | ....do........ | CH₃—CO \ CH— / —HN—CO | 1-phenyl-3-methyl-5-pyrazolone-4′-sulfonic acid. | —CH₂—CH₂— | | —O— | Aftercop.. | Do. |
| 36 | ....do........ | CH₃—CO \ CH— / —HN—CO | 1-acetoacetylaminobenzene-4-sulfonic acid. | —CH₂—CH₂— | | —O— | Aftercop.. | Reddish yellow. |
| 37 | ....do........ | CH₃—CO \ CH— / —HN—CO | ....do............ | —(CH₂)₃— | —HN—CO—NH— | —O— | Aftercop.. | Orange. |
| 38 | ....do........ | CH₃—CO \ CH— / —HN—CO | ....do............ | —(CH₂)₃— | | | Aftercop.. | Do. |
| 39 | ....do........ | CH₃—CO \ CH— / —HN—CO | ....do............ | —(CH₂)₄— | | | Aftercop.. | Do. |
| 40 | ....do........ | CH₃—CO \ CH— / —HN—CO | 2-hydroxynaphthalene-3.6-disulfonic acid. | —(CH₂)₃— | —HN—OC—CH ‖ —HN—OC—CH | —O— | Aftercop.. | Brown-orange. |
| 41 | ....do........ | CH₃—CO \ CH— / —HN—CO | ....do............ | —(CH₂)₃— | | | Aftercop.. | Brown. |

Table I—Continued

| Ex. No. | A | Z | B radical of— | R | v | x | Form in which applied | Shade of metal-containing dyeing on cotton |
|---|---|---|---|---|---|---|---|---|
| 42 | 2.2'-disulfo-4.4'-stilbenyl. | CH₃—CO\\CH—/—HN—CO | 2-hydroxynaphthalene-3.6-disulfonic acid. | —CH₂—CH₂— | —HN—OC—C₆H₄—HN—OC— | —O— | Aftercop.. | Brown-orange. |
| 43 | ....do.... | CH₃—CO\\CH—/—HN—CO | 1-(2'-naphthyl)-3-methyl-5-pyrazolone-6'-sulfonic acid. | —CH₂—CH₂— | —HN—CO—NH— | —O— | Aftercop.. | Do. |
| 44 | 2-sulfo-1.4-phenylene. | CH₃—CO\\CH—/—HN—CO | ....do.... | —CH₂—CH₂— | —HN—CO—NH— | —O— | Cu—C.... | Do. |
| 45 | 2-sulfo-4.4'-diphenylene. | CH₃—CO\\CH—/—HN—CO | ....do.... | —CH₂—CH₂— |  | —O— | Aftercop.. | Orange. |
| 46 | ....do.... | CH₃—CO\\CH—/—HN—CO | 1-acetylamino-8-hydroxynaphthalene-3.6-disulfonic acid. | —CH₂—CH₂— | —HN—CO—NH— | —O— | Cu—C.... | Brown. |
| 47 | ....do.... | CH₃—CO\\CH—/—HN—CO | ....do.... | —CH₂—CH₂— | —HN—CO—NH— | —O— | Ni—C.... | Do. |
| 48 | 2.2'-disulfo-4.4'-stilbenyl. | CH₃—CO\\CH—/—HN—CO | 1-acetoacetylamino-benzene-4-sulfonic acid. | —CH₂—CH₂— | —HN—OC—CCl‖—HN—OC—CH | —O— | Cu—C.... | Orange. |
| 49 | ....do.... | O=C—N—/—CH\\C=N—CH₃ | 1-phenyl-3-methyl-5-pyrazolone-4'-sulfonic acid. | —CH₂—CH—\|CH₃ | —HN—OC—CH=CH\|—HN—OC—CH=CH | —O— | Aftercop.. | Do. |
| 50 | ....do.... | O=C—N—/—CH\\C=N—CH₃ | ....do.... | —CH₂—CH₂ | —HN—OC—C—CH₃‖—HN—OC—CH | —O— | Aftercop.. | Do. |
| 51 | ....do.... | O=C—N—/—CH\\C=N—CH₃ | 1-phenyl-3-methyl-5-pyrazolone-3'-sulfonic acid. | —CH₂—CH₂ | —HN—OC—CCl=CH\|—HN—OC—CCl=CH | —O— | Aftercop.. | Do. |
| 52 | ....do.... | O=C—N—/—CH\\C=N—CH₃ | 1-(2',3'-tetramethylene)-phenyl-3-methyl-5-pyrazolone-4'-sulfonic acid. | —(CH₂)₃ |  |  | Aftercop.. | Do. |
| 53 | ....do.... | O=C—N—/—CH\\C=N—CH₃ | ....do.... | —CH₂—CH—\|CH₃ |  | —O— | Aftercop.. | Do. |
| 54 | ....do.... | O=C—N—/—CH\\C=N—CH₃ | 1-acetylamino-8-hydroxynaphthalene-3.6-disulfonic acid. | —CH₂—CH—\|CH₃ | —NH—CO—NH— | —O— | Cu—C.... | Brown. |

Table I—Continued

| Ex. No. | A | Z | B radical of— | R | v | x | Form in which applied | Shade of metal-containing dyeing on cotton |
|---|---|---|---|---|---|---|---|---|
| 55 | 2-sulfo-1.4-phenylene. | 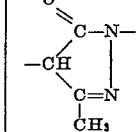 | 2-acetoacetylamino-naphthalene-6-sulfonic acid. | —CH$_2$—CH—<br>    $\vert$<br>    CH$_3$ | | —O— | Aftercop | Orange. |
| 56 | ....do.... | CH$_3$—CO<br>      $\diagdown$<br>         CH—<br>      $\diagup$<br>—HN—CO | 1-phenyl-3-methyl-5-pyrazolone-4'-sulfonic acid. | —CH$_2$—CH—<br>    $\vert$<br>    CH$_3$ | —HN—OC—CH<br>              $\vert\vert$<br>—HN—OC—CH | —O— | Aftercop | Do. |

The disazo dyestuffs and their metal complex compounds which are enumerated in Table II correspond in the metal-free state to the formula

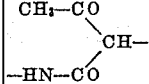

(XI)

They are characterized by the symbols C, D, Z, Z' and v, by the form in which they are applied, and by the shade of the metal-containing dyeing on cotton. In columns C and D the letters signify

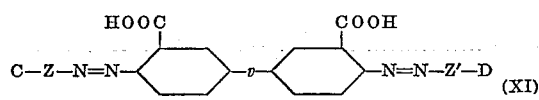

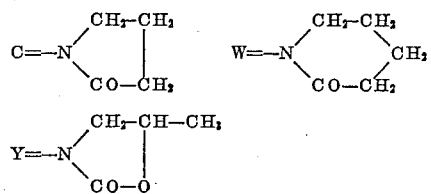

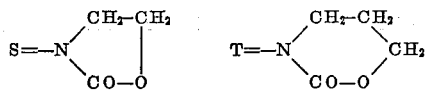

In the column "Form in which applied" the abbreviations mean
Cu-K = Copper complex compound
Ni-C = Nickel complex compound
Aftercop. = Aftercoppering dyestuff

Table II

| Ex. No. | C | Z | Z' | D | v | Form in which applied | Shade of metal-containing dyeing on cotton |
|---|---|---|---|---|---|---|---|
| 57 | 4-S-2.2'-disulfo-4'-stilbenyl. | O=C—N—<br>    $\vert$<br>—CH<br>    $\diagdown$<br>     C=N<br>        $\vert$<br>        CH$_3$ | As Z | As C | —HN—CO—NH— | Aftercop | Orange. |
| 58 | ....do.... | O=C—N—<br>    $\vert$<br>—CH<br>    $\diagdown$<br>     C=N<br>        $\vert$<br>        CH$_3$ | CH$_3$—CO—CH—CO—NH—<br>                     $\vert$ | As C | | Aftercop | Do. |
| 59 | ....do.... | O=C—N—<br>    $\vert$<br>—CH<br>    $\diagdown$<br>     C=N<br>        $\vert$<br>        CH$_3$ | CH$_3$—CO—CH—CO—NH—<br>                     $\vert$ | 4-S-2-sulfo-1-phenylene. | —HN—CO—NH— | Ni-C | Do. |
| 60 | ....do.... | O=C—N—<br>    $\vert$<br>—CH<br>    $\diagdown$<br>     C=N<br>        $\vert$<br>        CH$_3$ | O=C—N—<br>    $\vert$<br>—HC<br>    $\diagdown$<br>     C=N<br>        $\vert$<br>        CH$_3$ | ....do.... | —HN—OC—CH<br>              $\vert\vert$<br>—HN—OC—CH | Aftercop | Do. |
| 61 | ....do.... | O=C—N—<br>    $\vert$<br>—CH<br>    $\diagdown$<br>     C=N<br>        $\vert$<br>        CH$_3$ | O=C—N—<br>    $\vert$<br>—HC<br>    $\diagdown$<br>     C=N<br>        $\vert$<br>        CH$_3$ | ....do.... | —HN—CO—NH— | Cu-C | Do. |
| 62 | 4-T-2.2'-disulfo-4'-stilbenyl. | O=C—N—<br>    $\vert$<br>—CH<br>    $\diagdown$<br>     C=N<br>        $\vert$<br>        CH$_3$ | O=C—N—<br>    $\vert$<br>—HC<br>    $\diagdown$<br>     C=N<br>        $\vert$<br>        CH$_3$ | ....do.... | —HN—CO—NH— | Cu-C | Do. |
| 63 | 4-V-2.2'-disulfo-4'-stilbenyl. | O=C—N—<br>    $\vert$<br>—CH<br>    $\diagdown$<br>     C=N<br>        $\vert$<br>        CH$_3$ | O=C—N—<br>    $\vert$<br>—HC<br>    $\diagdown$<br>     C=N<br>        $\vert$<br>        CH$_3$ | ....do.... | | Aftercrop | Do. |

Table II—Continued

| Ex. No. | C | Z | Z' | D | v | Form in which applied | Shade of metal-containing dyeing on cotton |
|---|---|---|---|---|---|---|---|
| 64 | 4-W-2.2'-disulfo-4'-stilbenyl. | O=C—N—<br>—CH<br>C=N<br>CH₃ | As Z | 4-S-2 sulfo-1-phenylene. | | Aftercop. | Orange. |
| 65 | 4-S-2-sulfo-4'-diphenylene. | O=C—N—<br>—CH<br>C=N<br>CH₃ | As Z | do | | Aftercop. | Do. |
| 66 | 4-S-2-sulfo-1-phenylene. | O=C—N—<br>—CH<br>C=N<br>CH₃ | As Z | do | —HN—OC—CH<br>‖<br>—HN—OC—CH | Cu-O | Do. |
| 67 | do | O=C—N—<br>—CH<br>C=N<br>CH₃ | As Z | do | —HN—OC—⟨ring⟩—HN—OC | Cu-O | Do. |
| 68 | do | O=C—N—<br>—CH<br>C=N<br>CH₃ | As Z | 4-T-2-sulfo-1-phenylene. | —HN—CO—NH— | Cu-O | Reddish yellow. |
| 69 | 4-S-2.2'-disulfo-4'-stilbenyl. | O=C—N—<br>—CH<br>C=N<br>CH₃ | As Z | do | —HN—OC—CH=CH<br>—HN—OC—CH=CH | Aftercop. | Orange. |
| 70 | 4-Y-2.2'-disulfo-4'-stilbenyl. | O=C—N—<br>—CH<br>C=N<br>CH₃ | As Z | 4-Y-2-sulfo-1-phenylene. | | Aftercop. | Do. |
| 71 | do | O=C—N—<br>—CH<br>C=N<br>CH₃ | CH₃—CO<br>       CH—<br>—HN—CO | do | | Aftercop. | Do. |

Formulae of representative dyestuffs of the foregoing examples are:

EXAMPLE 1

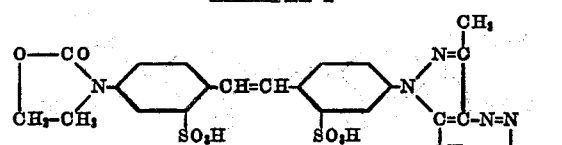
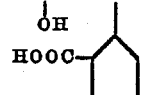
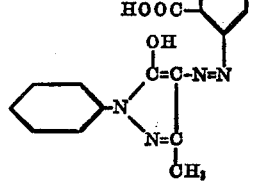

EXAMPLE 2
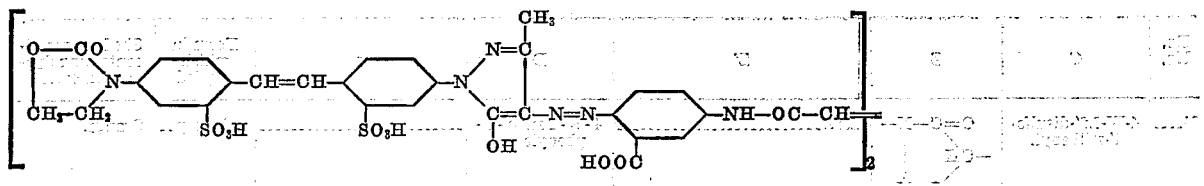
EXAMPLE 3
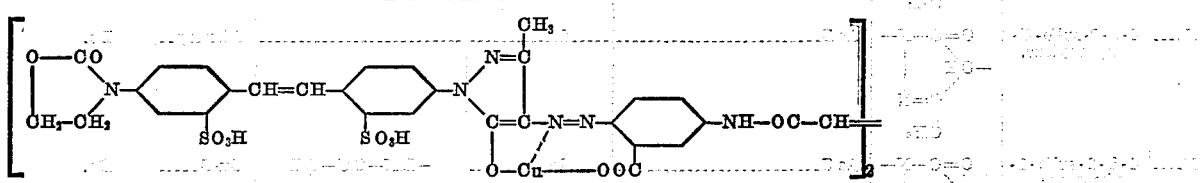
EXAMPLE 4
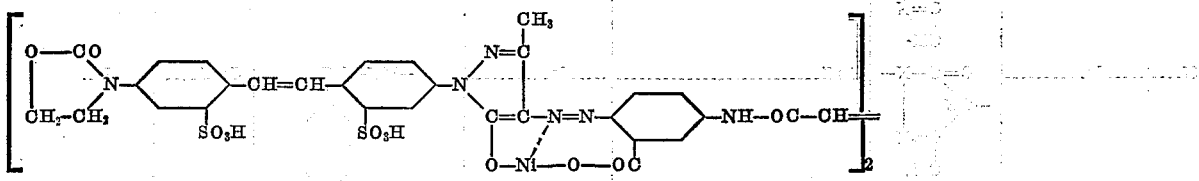
EXAMPLE 5
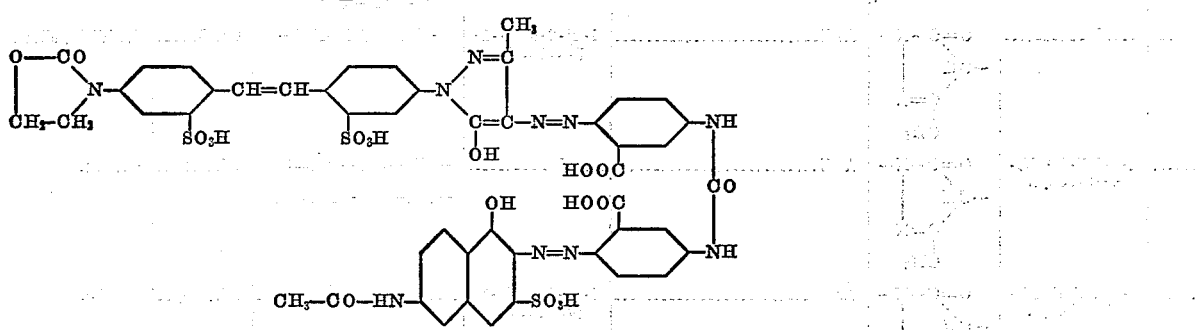
EXAMPLE 6
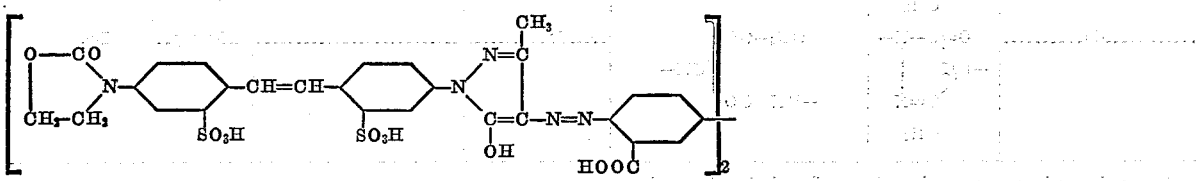
EXAMPLE 17
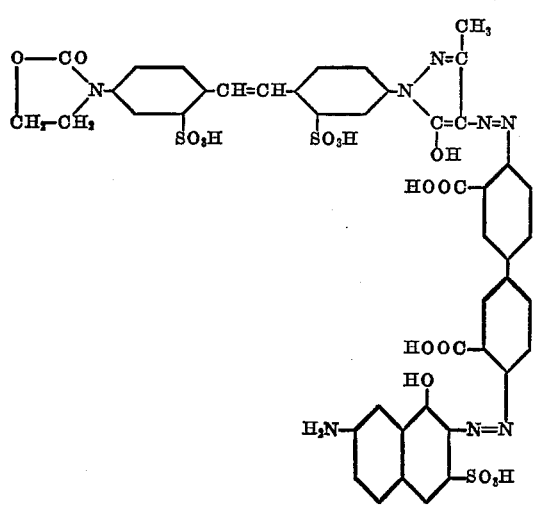
EXAMPLE 34
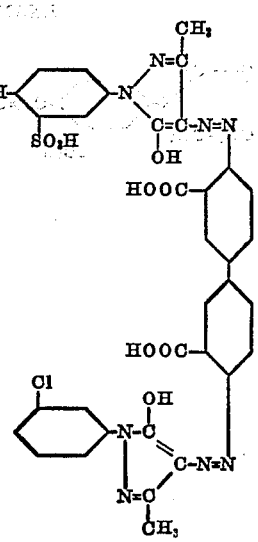

EXAMPLE 43

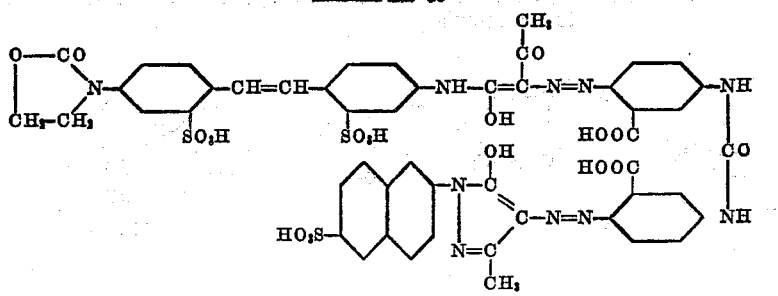

Having thus disclosed the invention what is claimed is:

1. A member selected from the group consisting of a disazo dyestuff which corresponds to the formula

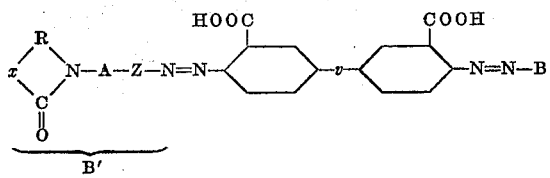

and the copper and nickel complex compounds thereof, wherein:

$v$ stands for a member selected from the group consisting of a simple carbon linkage, —HN—CO—NH—
—HN—OC—CH=CH—CO—NH—
—HN—OC—CCl=CH—CO—NH—
—HN—OC—C(CH₃)=CH—CO—NH—
—HN—OC—CH=CH—CH=CH—CO—NH—
—HN—OC—CCl=CH—CH=CCl—CO—NH— and

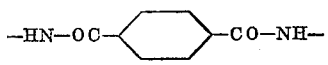

$x$ stands for a member selected from the group consisting of a simple carbon linkage and an oxygen atom, Z stands for a member selected from the group consisting of the radicals

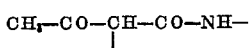

and

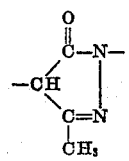

R stands for a member selected from the group consisting of —CH₂—CH₂—, —CH₂—CH₂—CH₂— and

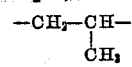

when $x$ represents an oxygen atom and for a polymethylene chain with 3 to 4 carbon atoms, when $x$ represents a simple carbon linkage, A stands for a member selected from the group consisting of 2-sulfo-1,4-phenylene, 2-sulfo-4,4'-diphenylene and 2,2'-disulfo-4,4'-stilbenyl radicals and B stands for a member selected from the group consisting of radicals designated by B', radicals of coupling components of the 1-mononuclear aryl-3-methyl-5-pyrazolone series, radicals of coupling components of the 1-(2',3'-tetramethylene)-phenyl-3-methyl-5-pyrazolone series, radicals of coupling components of the 1-naphthyl-3-methyl-5-pyrazolone series, radicals of coupling components of the 1-mononuclear aryl-5-pyrazolone-3-carboxylic acid amide series, radicals of coupling components of the acetoacetylamino-alkane series, radicals of coupling components of the acetoacetylamino-benzene series, radicals of coupling components of the acetoacetylaminonaphthalene series, radicals of coupling components of the hydroxynaphthalene series, all these radicals being coupled in ortho-position to hydroxy.

2. A metallizable disazo dyestuff which corresponds to the formula

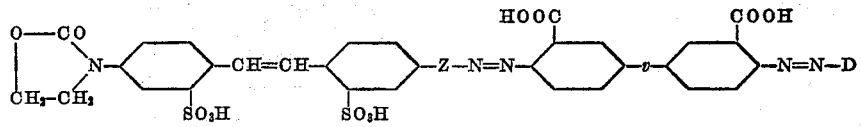

wherein:

D stands for a member selected from the group consisting of the radical of a 1-phenyl-3-methyl-5-pyrazolone, the radical of a 1-naphthyl-3-methyl-5-pyrazolonesulfonic acid, the radical of an aminohydroxynaphthalenesulfonic acid and the radical of an acetylaminohydroxynaphthalenesulfonic acid coupled in ortho position to the hydroxy group, $v$ stands for a member selected from the group consisting of a simple carbon linkage, —HN—CO—NH—
—HN—OC—CH=CH—CO—NH—
—HN—OC—CCl=CH—CO—NH—
—HN—OC—C(CH₃)=CH—CO—NH—
—HN—OC—CH=CH—CH=CH—CO—NH—
—HN—OC—CCl=CH—CH=CCl—CO—NH— and

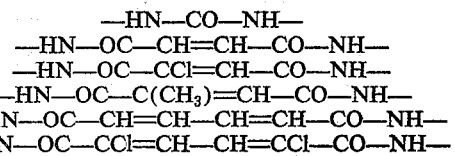

and

Z stands for a member selected from the group consisting of the radicals

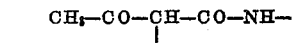

and

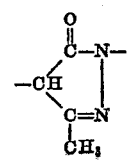

3. The metallizable disazo dyestuff which corresponds to the formula

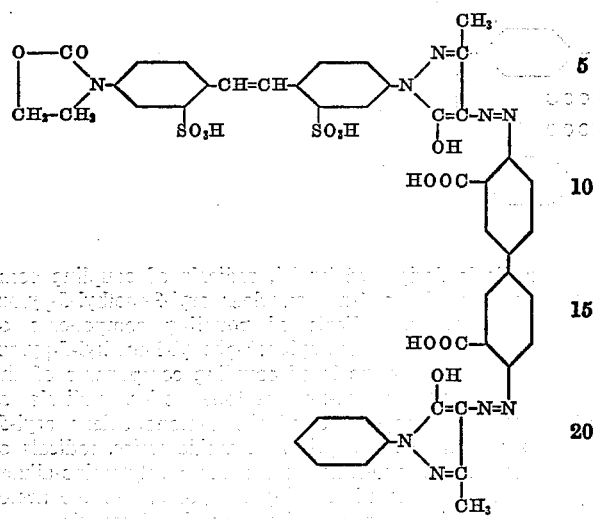

4. The metallizable disazo dyestuff which corresponds to the formula

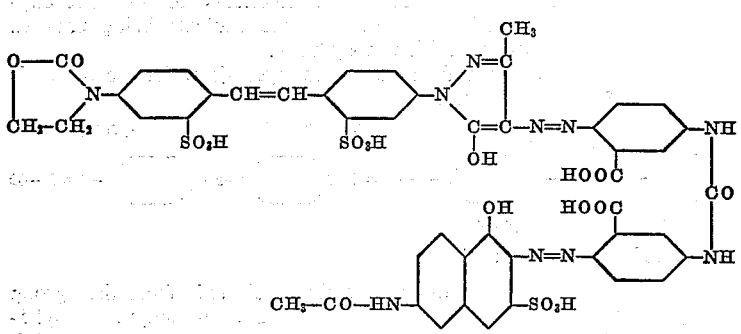

5. The metallizable disazo dyestuff which corresponds to the formula

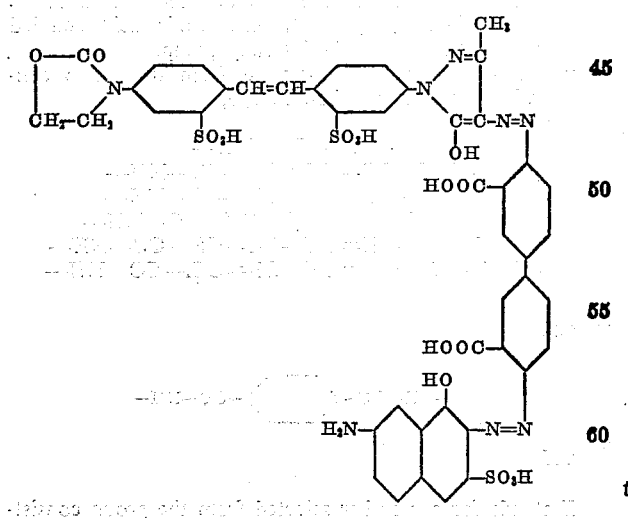

6. The metallizable disazo dyestuff which corresponds to the formula

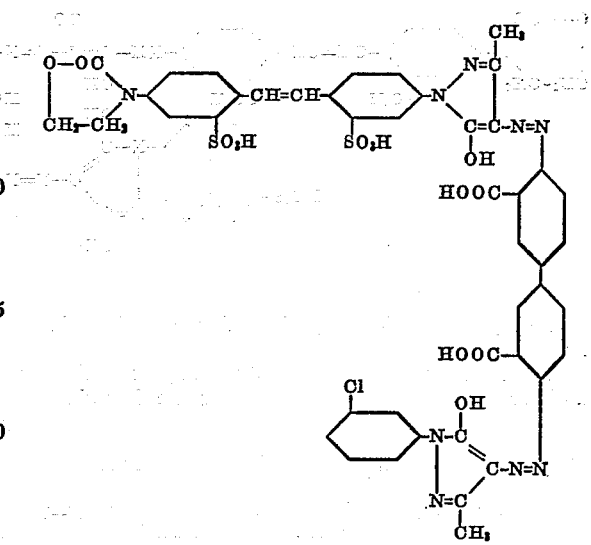

7. The metallizable disazo dyestuff which corresponds to the formula

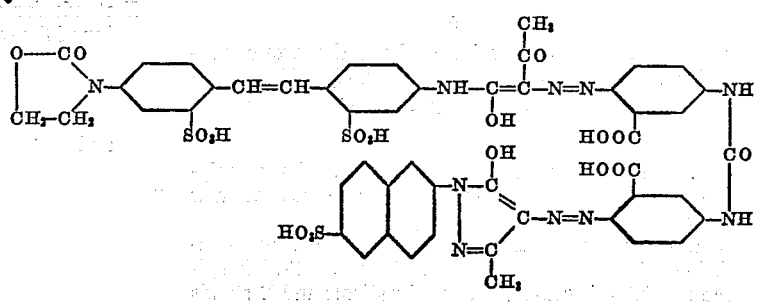

No references cited.

UNITED STATES PATENT OFFICE
Certificate of Correction

Patent No. 2,895,951  July 21, 1959

Willy Steinemann

It is hereby certified that error appears in the printed specification of the above numbered patent requiring correction and that the said Letters Patent should read as corrected below.

Column 3, line 31, for "weekly" read —weakly—; column 6, lines 39 to 42, inclusive, the extreme right-hand portion of the formula should appear as shown below instead of as in the patent:

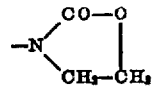

column 16, lines 19 to 21, inclusive, the left-hand formula should appear as shown below instead of as in the patent:

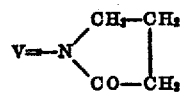

Signed and sealed this 10th day of May 1960.

[SEAL]

Attest:
KARL H. AXLINE,
*Attesting Officer.*

ROBERT C. WATSON,
*Commissioner of Patents.*